US011841995B2

(12) United States Patent
Kim et al.

(10) Patent No.: US 11,841,995 B2
(45) Date of Patent: *Dec. 12, 2023

(54) DISPLAY DEVICE AND METHOD THEREOF

(71) Applicant: SAMSUNG ELECTRONICS CO., LTD., Suwon-si (KR)

(72) Inventors: Hyun-Ho Kim, Seoul (KR); Chang-joo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,788

(22) Filed: Mar. 14, 2022

(65) Prior Publication Data
US 2022/0197453 A1 Jun. 23, 2022

Related U.S. Application Data

(63) Continuation of application No. 17/131,028, filed on Dec. 22, 2020, now Pat. No. 11,275,487, which is a
(Continued)

(30) Foreign Application Priority Data

Jul. 14, 2011 (KR) .............................. 2011-0069831
Mar. 23, 2012 (KR) ........................ 10-2012-0030115

(51) Int. Cl.
*G06F 3/0338* (2013.01)
*H04N 21/422* (2011.01)
(Continued)

(52) U.S. Cl.
CPC .......... *G06F 3/0338* (2013.01); *G06F 3/0234* (2013.01); *G06F 3/0482* (2013.01);
(Continued)

(58) Field of Classification Search
CPC .... G06F 3/0234; G06F 1/1601; G06F 1/3265; G06F 3/0482; G06F 3/14; H04N 21/47;
(Continued)

(56) References Cited

U.S. PATENT DOCUMENTS 4,968,257 A   11/1990 Yalen
5,548,345 A   8/1996 Brian
(Continued)

FOREIGN PATENT DOCUMENTS

CN   1243990 A   2/2000
CN   1798289 A   7/2006
(Continued)

OTHER PUBLICATIONS

Communication dated Jan. 24, 2022 issued by the State Intellectual Property Office of the P.R. China in application No. 201810985599.7.
(Continued)

*Primary Examiner* — Sanjiv D. Patel
(74) *Attorney, Agent, or Firm* — Sughrue Mion, PLLC

(57) ABSTRACT

A display device is provided, which includes a jog switch which performs a moving operation in a plurality of directions and a push operation, a display unit which displays a first user interface (UI) for adjusting a channel or a volume of the display device or a second UI for adjusting other functions of the display device in accordance with a first operation of the jog switch, and a control unit which adjusts a selected function of the display device in accordance with a second operation of the jog switch in which is performed in a state where the first UI or the second UI is displayed. The jog switch is formed to project for a predetermine height from a surface of the display device, and thus a user can find the jog switch easily and promptly even is the jog switch is obstructed from view.

12 Claims, 6 Drawing Sheets

Related U.S. Application Data continuation of application No. 16/667,970, filed on Oct. 30, 2019, now Pat. No. 10,895,967, which is a continuation of application No. 16/419,550, filed on May 22, 2019, now Pat. No. 10,496,257, which is a continuation of application No. 16/122,671, filed on Sep. 5, 2018, now Pat. No. 10,627,919, which is a continuation of application No. 13/531,885, filed on Jun. 25, 2012, now Pat. No. 10,114,477.

(51) Int. Cl.
| | | |
|---|---|---|
| *G06F 3/0482* | (2013.01) | |
| *G06F 3/023* | (2006.01) | |
| *G06F 3/04842* | (2022.01) | |
| *G06F 3/04895* | (2022.01) | |

(52) U.S. Cl.
CPC ...... *G06F 3/04842* (2013.01); *G06F 3/04895* (2013.01); *H04N 21/4221* (2013.01); *H04N 21/42204* (2013.01)

(58) Field of Classification Search
CPC ........... H04N 21/485; H04N 21/42204; G09G 5/003; G09G 5/006; G09G 2330/021; G09G 2340/12
See application file for complete search history.

(56) References Cited

U.S. PATENT DOCUMENTS

| | | | |
|---|---|---|---|
| 5,691,778 A * | 11/1997 | Song | H04N 21/47 348/569 |
| 6,208,335 B1 | 3/2001 | Gordon et al. | |
| 6,281,895 B1 | 8/2001 | Jeong | |
| 6,297,795 B1 | 10/2001 | Kato et al. | |
| 6,496,181 B1 | 12/2002 | Bomer | |
| 6,806,865 B2 | 10/2004 | Oueslati et al. | |
| 7,091,430 B1 | 8/2006 | Haizima | |
| 7,856,255 B2 | 12/2010 | Tsuchiya | |
| 7,936,396 B2 | 5/2011 | Okazaki | |
| 8,004,616 B2 * | 8/2011 | Kitamura | H04N 5/63 348/730 |
| 8,134,648 B2 | 3/2012 | Kendall | |
| 8,188,972 B1 * | 5/2012 | Krenz | G06F 3/0482 345/157 |
| 8,810,734 B2 | 8/2014 | Dorsey | |
| 2002/0171627 A1 | 11/2002 | Noguchi et al. | |
| 2003/0133040 A1 | 7/2003 | Konodo et al. | |
| 2003/0206151 A1 | 11/2003 | Oross et al. | |
| 2004/0211282 A1 | 10/2004 | Kim | |
| 2005/0062724 A1* | 3/2005 | Kim | H04N 21/485 348/E5.127 |
| 2005/0096812 A1* | 5/2005 | Nezu | G06F 3/04847 701/1 |
| 2005/0156818 A1 | 7/2005 | Tsuji | |
| 2005/0179667 A1 | 8/2005 | Nilsson et al. | |
| 2006/0007143 A1* | 1/2006 | Davani | G06F 1/1616 345/161 |
| 2006/0158426 A1 | 7/2006 | Hagiwara | |
| 2007/0093281 A1 | 4/2007 | Park et al. | |
| 2007/0104461 A1 | 5/2007 | Cho | |
| 2007/0155427 A1 | 7/2007 | Tran | |
| 2007/0279380 A1 | 12/2007 | Murillo | |
| 2008/0259025 A1 | 10/2008 | Eom | |
| 2008/0284856 A1 | 11/2008 | Okazaki | |
| 2008/0315059 A1 | 12/2008 | Kaneko | |
| 2009/0059091 A1* | 3/2009 | Dorsey | H04N 21/485 348/734 |
| 2009/0128447 A1 | 5/2009 | Yoshikawa | |
| 2009/0150691 A1 | 6/2009 | Chen et al. | |
| 2009/0170566 A1 | 7/2009 | Kwon | |
| 2009/0219683 A1 | 9/2009 | Kitahara | |
| 2009/0237384 A1 | 9/2009 | Hu | |
| 2010/0014005 A1 | 1/2010 | Yano et al. | |
| 2010/0141851 A1 | 6/2010 | Kendall | |
| 2010/0157170 A1 | 6/2010 | Carlsgaard et al. | |
| 2011/0127150 A1 | 6/2011 | Lee et al. | |
| 2012/0293413 A1 | 11/2012 | Luo | |

FOREIGN PATENT DOCUMENTS

| | | |
|---|---|---|
| CN | 101112083 A | 1/2008 |
| CN | 101253765 A | 8/2008 |
| CN | 101335845 A | 12/2008 |
| CN | 101458552 A | 6/2009 |
| CN | 201732356 U | 2/2011 |
| EP | 1 519 155 A1 | 3/2005 |
| EP | 1 986 081 A1 | 10/2008 |
| JP | 2000284884 A | 10/2000 |
| KR | 0137858 B1 | 2/1998 |
| KR | 2019980028850 U | 8/1998 |
| KR | 20000065948 A | 11/2000 |
| KR | 10-2006-0071118 A | 6/2006 |
| KR | 10-2007-0050267 A | 5/2007 |
| KR | 1020070102605 A | 10/2007 |
| KR | 10-2008-0033082 A | 4/2008 |
| KR | 1020080095085 A | 10/2008 |
| KR | 10-2010-0005275 A | 1/2010 |
| KR | 10-2013-0009595 A | 1/2013 |
| WO | 2006/085850 A1 | 8/2006 |
| WO | 2009/005507 A2 | 1/2009 |

OTHER PUBLICATIONS

Communication dated Jul. 2, 2021 by the State Intellectual Property Office of P.R. China in counterpart Chinese Patent Application No. 201810985599.7.

Communication dated Jul. 22, 2021 by the Korean Intellectual Property Office in counterpart Korean Patent Application No. 10-2020-0120076.

Communication dated Jan. 12, 2021 issued by the State Intellectual Property Office of P.R. China in counterpart Chinese Application No. 201810985599.7.

Communication dated Dec. 2, 2020 issued by the Korean Intellectual Property Office in counterpart Korean Application No. 10-2020-0120076.

Communication dated Aug. 20, 2020, issued by the Korean Intellectual Property Office in corresponding Korean Application No. 10-2019-0175327.

Communication dated Mar. 19, 2020, issued by the Korean Intellectual Property Office in counterpart Korean Application No. 10-2019-0175327.

Communication dated Apr. 15, 2020, issued by the European Patent Office in counterpart European Application No. 19209845.7.

Communication dated Nov. 12, 2019, issued by the Korean Intellectual Property Office in counterpart Korean Patent Application No. 10-2018-0083671.

Communication dated Sep. 25, 2019, from the European Patent Office in counterpart European Application No. 18213192.0.

Office Action dated May 29, 2019 from the U.S. Patent and Trademark Office in U.S. Appl. No. 16/122,671.

Communication dated Aug. 16, 2016, issued by the Korean Intellectual Property Office in counterpart Korean Application No. 10-2012-0030115.

Communication dated Jul. 27, 2016, issued by the State Intellectual Property Office of P.R. China in counterpart Chinese Application No. 201210245544.5.

Communication dated Sep. 2, 2018, issued by the Korean Intellectual Property Office in counterpart Korean Patent Application No. 10-2018-0083671.

Communication dated Aug. 24, 2017, issued by the Chinese Patent Office in counterpart Application No. 201210245544.5.

Communication dated Sep. 23, 2016, issued by the European Patent Office in counterpart European Application No. 12175698.5.

Communication dated Apr. 14, 2017, issued by the State Intellectual Property Office of P.R. China in counterpart Chinese Application No. 201210245544.5.

(56) References Cited

OTHER PUBLICATIONS

Communication dated Dec. 1, 2017, issued by the Chinese Patent Office in counterpart Chinese application No. 201210245544.5.
Communication from the European Patent Office dated Oct. 1, 2015 in a counterpart European Application No. 12175698.5.
Communication dated Aug. 23, 2017 issued by the Korean Patent Office in counterpart Application No. 10-2017-0065491.
Communication dated Mar. 29, 2017, issued by the European Patent Office in counterpart European Application No. 12175698.5.
HDTV outperforming DVDP—Viewsonic 'N2201w', NEXT DAILY, http://www.nextdaily.co.kr/news/article.html?id=20081202800038, Dec. 2, 2008, 6 pages total.
Extended Search Report dated Mar. 8, 2019.
Korean Office Action 10-2018-0083671 dated Apr. 16, 2019.

\* cited by examiner

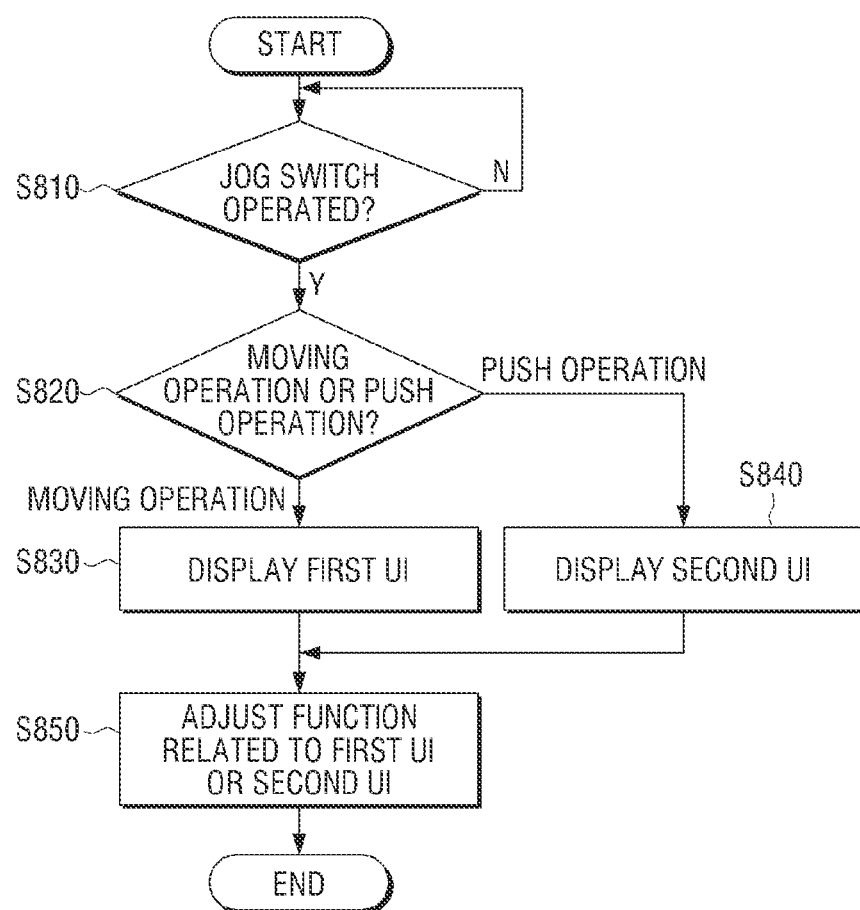

DISPLAY DEVICE AND METHOD THEREOF

CROSS-REFERENCE TO RELATED APPLICATIONS

This application is a continuation of U.S. patent application Ser. No. 17/131,028, filed on Dec. 22, 2020, which is a continuation of U.S. patent application Ser. No. 16/667,970, filed Oct. 30, 2019, now U.S. Pat. No. 10,895,967, issued on Jan. 19, 2021, which is a continuation of U.S. patent application Ser. No. 16/419,550, filed on May 22, 2019, now U.S. Pat. No. 10,496,257, issued on Dec. 3, 2019, which is a continuation of U.S. patent application Ser. No. 16/122,671, filed on Sep. 5, 2018, now U.S. patent Ser. No. 10/627,919, issued on Apr. 21, 2020, which is a continuation of U.S. patent application Ser. No. 13/531,885, filed on Jun. 25, 2012, now U.S. Pat. No. 10,114,477, issued on Oct. 30, 2018, which is based on and claims priority under 35 U.S.C. § 119(a) to Korean Patent Application No. 10-2012-0030115, filed on Mar. 23, 2012, in the Korean Intellectual Property Office, and Korean Patent Application No. 10-2011-0069831, filed on Jul. 14, 2011, in the Korean Intellectual Property Office, the disclosures of each of which are incorporated herein by reference in their entirety.

BACKGROUND

1. Field

The present invention relates to a display device and a method thereof, and more particularly to a display device and a method thereof, which can adjust functions of the display device.

2. Description of the Related Art

A display device in the related art, such as a television (TV) or a monitor, is provided with a plurality of input buttons for performing a screen state adjustment, a volume adjustment, a channel adjustment, and a power on/off adjustment. Such input buttons are arranged at a lower end of a front surface of a screen so that a user can easily operate the buttons, but may also be arranged at a location which is not exposed to an outside (e.g., a side surface or a rear surface of the display device) in accordance with a change of design or miniaturization of the display device.

As the plurality of input buttons for adjusting the functions of the display device are arranged on the side surface or the rear surface of the display device, a user must accept inconvenience in finding an input button for adjusting a desired function among the plurality of input buttons. Particularly, with the recent development of a display device having diverse functions such as a smart TV, the number of input buttons for operating the display device has been increased, and thus the user must put much more time in finding the input button for adjusting the desired function, which causes a greater inconvenience in use.

On the other hand, in the related art, a function guide information window that is related to the plurality of input buttons is provided on the screen of a display device through sensing of a user's hand when the user's hand approaches a location where the plurality of input buttons are positioned. Accordingly, the user can confirm a location of a desired input button with reference to the function guide information window displayed on the screen. Nevertheless, since the user is unable to confirm the location of the plurality of input buttons directly in plain sight (i.e., since the buttons are out of view of the user), the user is limited in finding a desired input button with reference to the function guide information window displayed on the screen, and it causes great inconvenience for the user to operate the input button while viewing the function guide information window. In addition, since information that is provided on the function guide information window through the sensing of the user's hand using a sensor does not correspond to the operation of the input button that the user actually intends to operate, it becomes very difficult for the user to operate the desired function.

SUMMARY

Exemplary embodiments have been made to address at least the above problems and/or disadvantages and to provide at least the advantages described below. Accordingly, an aspect of the exemplary embodiments provides a display device and a method thereof, which enable a user to easily operate functions of the display device without confirming with various input buttons shown in plain sight and to realize miniaturization and polished designs of the display device.

According to one aspect of an exemplary embodiment, a display device includes a jog switch capable of performing a moving operation in a plurality of directions and a push operation; a display unit displaying a first User Interface (UI) for adjusting a channel or volume of the display device or a second UI for adjusting other functions of the display device in accordance with operation contents of the jog switch; and a control unit adjusting the function of the display device in accordance with the following operation contents of the jog switch in a state where the first or second UI is displayed.

Preferably, the first UI is a circular UI that includes four areas arranged in upper, lower, left, and right directions and a center area; among the four areas, the upper area includes a channel-up menu, the lower area includes a channel-down menu, the right area includes a volume-up menu, and the left area includes a volume-down menu; and the center area includes an enter menu performing a changeover operation to the second UI.

Further, the first UI is a bar graph type UI, in which upper and lower horizontal bar graphs are formed in parallel, the upper bar graph indicates channel adjustment, and the lower bar graph indicates volume adjustment.

Preferably, the second UI is a circular UI that includes four areas arranged in upper, lower, left, and right directions and a center area or a block type UI that includes a center area and four areas separately arranged in upper, lower, left, and right directions from the center area; among the four areas, the upper area includes a sub menu related to a smart hub, the lower area includes a power off menu, the right area includes a source menu related to an external input, and the left area includes an adjustment menu for screen adjustment; and the center area includes an enter menu.

Further, the second UI is a circular UI that includes two areas arranged in upper and lower directions and a center area; among the two areas, the upper area includes one of other menus related to function adjustment of the display device, and the lower area includes one of the remaining menus except for the menu included in the upper area among the other menus related to the function adjustment of the display device; and the center area includes an enter menu.

Preferably, the display unit displays an enter menu function guide UI in accordance with a push operation time of the jog switch in the neighborhood of the first or second UI.

Preferably, the control unit includes a UI execution unit executing the first or second UI in accordance with the moving operation or the push operation of the jog switch; and a UI processing unit adjusting a channel or volume related to the first UI or adjusting a function of a menu related to the second UI in accordance with the moving operation or the push operation of the jog switch in a state where the first or second UI is executed.

Preferably, the UI processing unit includes a first UI adjustment unit adjusting the channel or the volume in accordance with the moving operation of the jog switch in a state where the first UI is executed; and a first UI menu emphasis unit processing a highlight in the menu area related to the channel or volume that is adjusted by the first UI adjustment unit.

Preferably, the first UI adjustment unit finishes the execution of the first UI if the push operation of the jog switch is performed for a preset time in a state where the first UI is executed.

Preferably, the UI processing unit includes a second UI menu emphasis unit processing a highlight in the menu area that corresponds to a moving operation direction of the jog switch among a plurality of menus related to the second UI in a state where the second UI is executed; and a second UI adjustment unit adjusting a function related to the highlight-processed menu in accordance with the push operation and the moving operation of the jog switch in a state where the highlight is processed in the menu area.

Preferably, if the push operation of the jog switch is performed for a time that is less than a preset time in a state where the second UI is executed, the second UI adjustment unit selects the highlight-processed menu, and if the push operation of the jog switch is performed for a preset time in a state where the second UI is executed, the second UI adjustment unit performs changeover to a just previous stage.

Further, the second UI adjustment unit finishes the execution of the first or second UI if the moving operation or the push operation of the jog switch is not performed for a preset time in a state where the first or second UI is executed.

According to another aspect of an exemplary embodiment, a method of adjusting functions of a display device having a jog switch provided on a side surface or a rear surface thereof includes displaying a first UI for adjusting a channel or volume of the display device if a moving operation of the jog switch is performed; displaying a second UI for adjusting other functions of the display device if a push operation of the jog switch is performed; and adjusting the function of the display device in accordance with the following operation contents of the jog switch in a state where the first or second UI is displayed.

Preferably, the method of adjusting functions of a display device according to an embodiment of the present invention further includes displaying a just previous state of the current UI or finishing the display of the first or second UI if the jog switch is pushed for a time that is longer than a preset threshold time in a state where the first or second UI is displayed.

Also, emphasizing the second UI menu moves a highlight processed in a menu area among a plurality of menus related to the second UI to the menu area corresponding to moving directions of the jog switch and processes the highlight in the menu area.

The jog switch performs a push operation related to power on/off of the display device and, when the display device power is on, the UI execution unit displays the first UI through the display unit in accordance with the push operation of the jog switch.

If the push operation of the jog switch is performed for a time that is less than a preset threshold time, the adjusting selects the functions corresponding to a following operation of the jog switch.

As described above, according to the diverse exemplary embodiments, the jog switch that is formed on the side surface or on one side of the rear surface of the display device projects for a predetermined height, and the user can find the jog switch easily and promptly. Further, not only can the moving operations of moving in the upper, lower, left, and right directions be performed through the jog switch, but also the push operation can be performed through the jog switch. Thus, diverse functional operations of the display device can be easily performed using only one jog switch. Further, since diverse functional operations of the display device can be performed using only one jog switch, the miniaturization and polished designs of the display device can be realized.

BRIEF DESCRIPTION OF THE DRAWINGS

The above and/or other aspects will be more apparent by describing in detail exemplary embodiments, with reference to the accompanying drawings, in which:

FIG. 8 is a flowchart illustrating a method of adjusting functions of a display device according to an exemplary embodiment.

DETAILED DESCRIPTION

Hereinafter, exemplary embodiments will now be described in detail with reference to the accompanying drawings.

Figure 1:
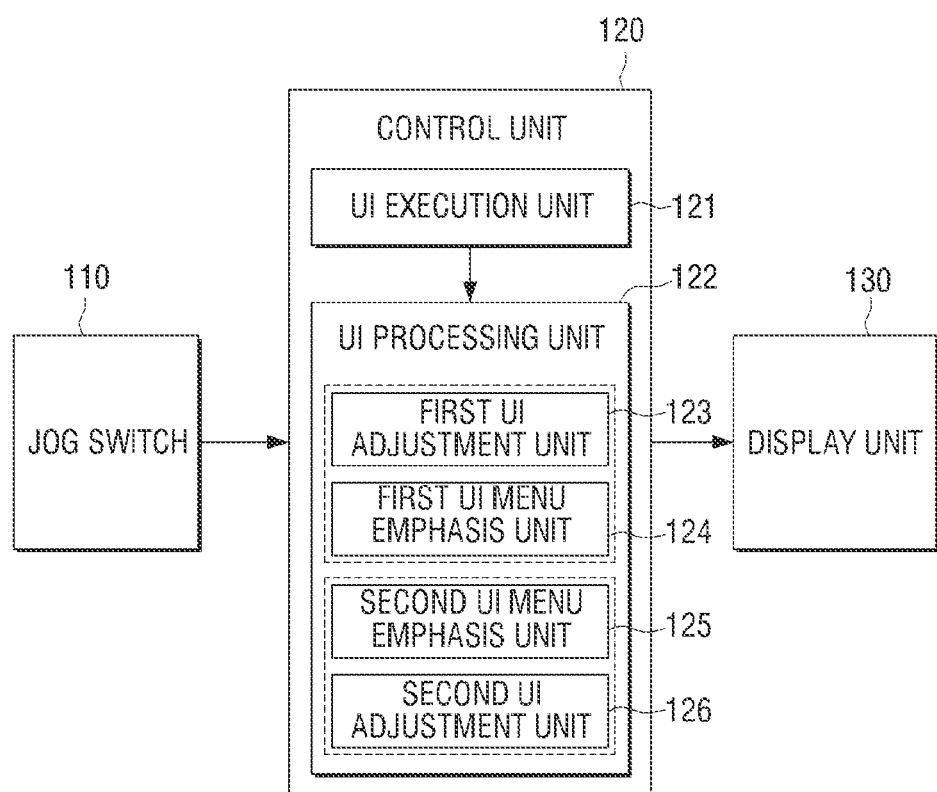
FIG. 1 is a block diagram illustrating the configuration of a display device according to an exemplary embodiment.

FIG. 1 is a block diagram illustrating the configuration of a display device according to an exemplary embodiment.

As illustrated in FIG. 1, the display device includes a jog switch 110, a control unit 120, and a display unit 130. The term "unit" as used herein means a hardware component, such as a processor or circuit, and/or a software component that is executed by a hardware component such as a processor.

The jog switch 110 is a switch through which a moving operation in a plurality of directions and a push operation can be performed. That is, the jog switch 110 can perform a moving operation in various directions, including in upper, lower, left, and right directions, in the same manner as a joystick, and can perform the push operation in the same manner as a button switch. Hereinafter, the operation of the jog switch 110 will be described in detail. The control unit 120 operates to display one of a plurality of user interfaces (UIs) through the display unit 130 in accordance with the operation of the jog switch 110. The display unit 130 displays a UI that corresponds to the operation of the jog switch 110 among the plurality of UIs on the screen in accordance with a display control command received from the control unit 120.

On the other hand, once one of the plurality of UIs is displayed, if a following operation of the jog switch 110 is performed in a state where the UI that corresponds to the first operation of the jog switch 110 is displayed through the display unit 130, the control unit 120 operates to adjust the function of the display device that is related to the displayed UI. In accordance with the adjustment control command from the control unit 120, the display unit 130 displays a sub-menu related to the displayed UI or adjustment result information. Here, the plurality of UIs, for example, may correspond to an On Screen Display (OSD) execution window formed on one side surface or one side of a rear surface of a TV or a monitor to provide a user with adjustment guide information regarding a screen state, a volume, and channel adjustments in accordance with the operation of an input button related to the screen state, volume, and channel adjustments. It is preferable that the input button related to the screen state, volume, and channel adjustments is the jog switch according to the exemplary embodiments.

More specifically, in accordance with the operation of the jog switch 110, the control unit 120 operates to display a first UI related to the volume or channel adjustment or a second UI for adjusting other functions of the display device, such as the screen state or power off. In accordance with the display control command received from the control unit 120, the display unit 130 displays the first UI or the second UI that corresponds to the operation of the jog switch 110. As described above, if a following operation of the jot switch 110 is performed in a state where the first or the second UI is displayed, the control unit 120 operates to adjust the function related to the first or the second UI in relation to the following operation of the jog switch 110. In this case, the display unit 130, in accordance with a processing command received from the control unit 110, displays the adjustment process result information of the function related to the first or the second UI, or displays a sub-menu that corresponds to the first or the second UI. Up to now, the constituent elements of an exemplary display device have been briefly described. Hereinafter, the operation of the above-described jog switch and the constituent elements of the control unit 120 will be described in detail, and further, the above-described UIs will be described in detail through diverse exemplary embodiments.

Figure 2:
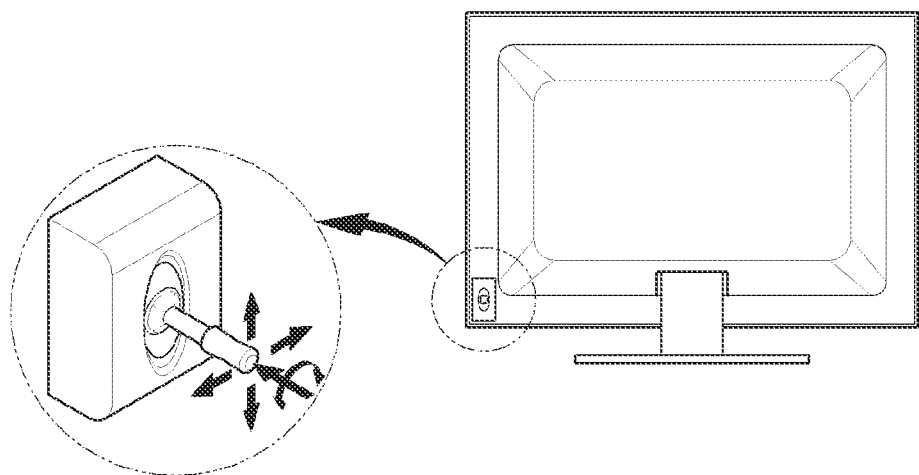
FIG. 2 is an exemplary diagram illustrating the arrangement and operation of a jog switch according to an exemplary embodiment.

FIG. 2 is an exemplary diagram illustrating the arrangement and operation of a jog switch according to an exemplary embodiment.

As illustrated, the jog switch 110 is an operation means for adjusting the volume, channel, screen power off, screen state, and the like of the display device, and is formed in a single shape as a singular unit, rather than a plurality of shapes and multiple units. The single jog switch 110 is formed to project with a predetermined height from one side surface or one side of the rear surface of the display device, and thus a user can easily grasp which location the jog switch 110 is formed at through feeling by the user's hand. That is, even if the jog switch 110 is formed at a point where the user's field of is obscured from the jog switch 110, the user can operate the jog switch 110 more easily since the upper end of the jog switch 110 projects with the predetermined height from a surface of the display device. However, the exemplary embodiments are not limited thereto, and the jog switch 110 may be formed at a location where the user's field of vision is not obscured from the jog switch 110 (e.g., on one side of a front surface portion of the display device).

As described above, the jog switch 110 can perform moving operations in upper, lower, left, and right directions in the same manner as a joystick and can perform a push operation in the same manner as a button switch by pushing the joystick inward. In addition, the joystick may be rotated (i.e., turned) around its axis like a knob. However, the exemplary embodiments are not limited thereto, and the jog switch 110 may move only in the left and the right directions.

In accordance with the moving operation or the push operation of the jog switch 110, the control unit 120 that adjusts the functions of the display device related to the first or second UI can be achieved through a UI execution unit 121 and a UI processing unit 122 as illustrated in FIG. 1.

The UI execution unit 121 executes the first or second UI in accordance with the moving operation or the push operation of the jog switch 110. In an exemplary embodiment, if the movement operation of the jog switch 110 is performed in one of the upper, lower, left, and right directions, the UI execution unit 121 controls the display unit 130 to display the first UI that is related to a first set of adjustment operations (e.g., the channel adjustment or the volume adjustment). On the other hand, if the push operation of the jog switch 110 is performed, the UI execution unit 121 controls the display unit 130 to display the second UI that is related to other adjustments operations of the display device (i.e., a second set of adjustment operations). In another exemplary embodiment, if the moving operation or the push operation of the jog switch 110 is performed, the UI execution unit 121 controls the display unit 130 to display an integrated UI that is configured to integrally adjust the channel, volume, and other functions of the display device.

Meanwhile, the jog switch 110 may perform a push operation related to a power on/off of the display device. Thus, in a state where the power of the display device is off, if the power of the display device is turned on, the UI execution unit 121 may control to display the first UI for adjusting a channel or a volume through the display unit 130.

As described above, the UI that is displayed on the screen in accordance with the execution control command of the UI execution unit 121 will now be described in detail.

First, referring to FIGS. 3 and 4, the UI related to the channel and volume that is displayed on the screen of the display device will be described.

Figure 3:
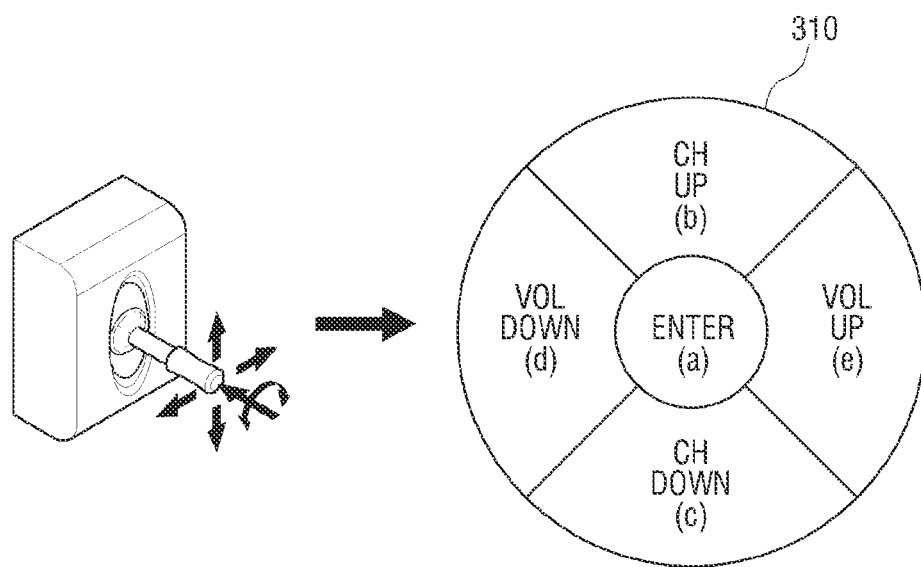
FIG. 3 is a first exemplary diagram illustrating a UI related to a channel and volume that is displayed on the screen of a display device according to an exemplary embodiment.

FIG. 3 is a first exemplary diagram illustrating a UI related to a channel and volume that is displayed on the screen of a display device according to an embodiment of the present invention.

As illustrated, if the moving operation of the jog switch 110 is performed in at least one of the upper, lower, left, and right directions, the UI execution unit 121 executes the first UI that is related to the channel and volume adjustments such that the first UI is displayed. The first UI related to the channel and volume adjustments, which is executed in accordance with the execution command of the UI execution unit 121, may be a circular UI 310 that includes four areas arranged in the upper, lower, left, and right directions and a center area. Here, the center area (a) includes an enter menu for finishing the execution of the circular UI 310 or for performing a changeover operation to the second UI, which will be described hereinafter.

Among the four areas that are arranged in the upper, lower, left, and right directions, the upper area (b) includes a channel-up menu, and the lower area (c) includes a channel-down menu. Further, the left area (d) includes a volume-down menu, and the right area (e) includes a volume-up menu. However, the exemplary embodiment is not limited thereto, and the positions of the menus that are included in the respective areas may be differently set. Accordingly, a movement operation (i.e., a first movement) of the jog switch 110 causes the first UI to be displayed, and a following execution operation (i.e., a second movement or movements) of the jog switch 110 causes a corresponding adjustment function to be performed in accordance with the movement direction of the second movement or movements of the jog switch 110. A push operation to select the enter menu in the center area (a) may be performed by the jog switch 110 to execute the adjustments selected by the second movement or movements, or the adjustments may be made as the second movement or movements are performed.

Figure 4:
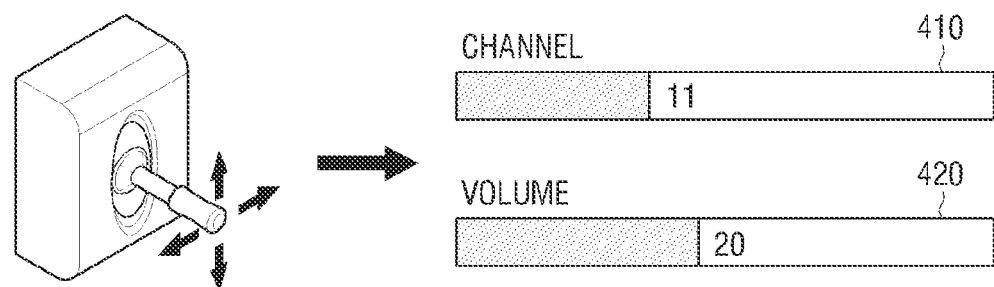
FIG. 4 is a second exemplary diagram illustrating a UI related to a channel and volume that is displayed on the screen of a display device according to another exemplary embodiment.

FIG. 4 is a second exemplary diagram illustrating a UI related to a channel and volume that is displayed on the screen of a display device according to another exemplary embodiment.

As illustrated, if the jog switch 110 is operated in at least one of the upper, lower, left, and right directions, the UI execution unit 121 executes the first UI that is related to the channel and volume adjustments such that the first UI is displayed. The first UI related to the channel and volume adjustments, which is executed in accordance with the execution command of the UI execution unit 121 may include bar graph type UIs 410 and 420. Such bar graph type UIs 410 and 420 are upper and lower horizontal bar graphs which are formed in parallel. The upper bar graph type UI 410 may be a UI related to a channel adjustment, and the lower bar graph type UI 420 may be a UI related to a volume adjustment. However, the exemplary embodiment is not limited thereto. The positions of the bar graph type UIs 410 and 420 related to the channel and volume adjustments may be changed with respect to one another, and the respective bar graph type UIs 410 and 420 may be formed as vertical bar graphs. Further, the exemplary embodiment is not limited thereto, and in accordance with the moving operation of the jog switch 110 in upper and lower directions or in left and right directions, the UI execution unit 121 may operate to display only one of the bar graph type UIs 410 and 420 related to the channel adjustment or to the volume adjustment on the screen.

Up to now, the UIs related to the channel and volume adjustments, which are displayed on the screen in accordance with the directional moving operation of the jog switch 110, according to the above-described exemplary embodiments have been described in detail. Hereinafter, referring to FIGS. 5 and 6, UIs related to other function adjustments of the display device will be described in detail.

Figure 5:
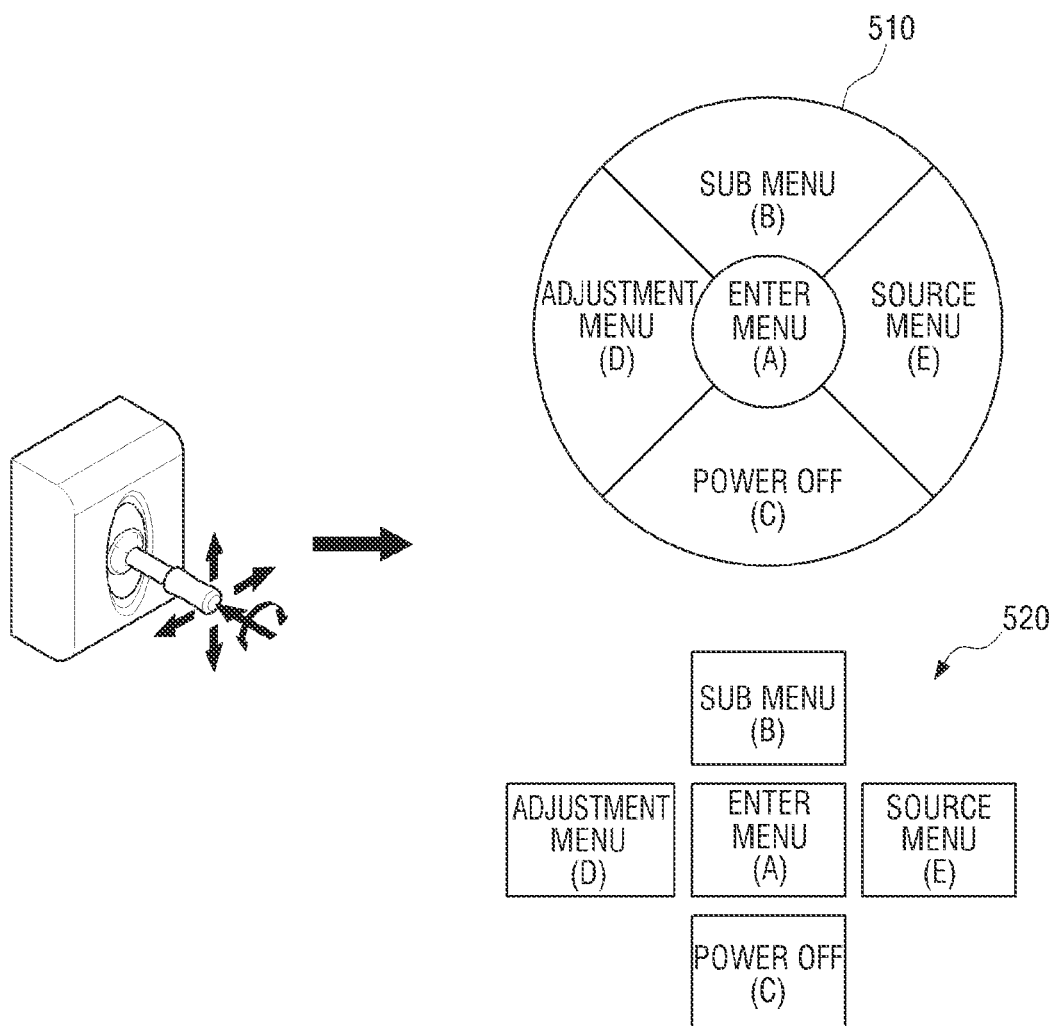
FIG. 5 is a first exemplary diagram illustrating a UI related to other function adjustment of a display device that is displayed on the screen of the display device according to still another exemplary embodiment.

FIG. 5 is a first exemplary diagram illustrating a UI related to other function adjustments of a display device that is displayed on the screen of the display device according to still another exemplary embodiment.

As illustrated, if the push operation of the jog switch 110 is performed, the UI execution unit 121 performs a second UI for adjusting other functions of the display device such that the second UI is displayed.

As described above, in an exemplary embodiment, if the push operation of the center area (a) of the jog switch 110 is performed in a state where the first UI is executed, the UI execution unit 121 converts the first UI for adjusting a channel or a volume of the display device into the second UI for adjusting other functions of the display device.

The second UI that is displayed in accordance with the execution command of the UI execution unit 121 may be a circular UI 510 that includes four areas arranged in the upper, lower, left, and right directions and a center area, or a block type UI 520 that includes a center area and four areas separately arranged in the upper, lower, left, and right directions from the center area. The center area (a) of the circular UI 510 or the block type UI 520 includes an enter menu for finishing the execution of the second UI such that the second UI is no longer displayed or for performing an operation to the previous stage. Further, among the four areas arranged in the upper, lower, left, and right directions, the upper area (b) includes a sub menu related to a smart hub adjustment, and the lower area (c) includes a menu related to power off. Further, the left area (d) includes an adjustment menu for a screen adjustment, and the right area (e) includes a source menu related to an external input adjustment for controlling an external device. However, the exemplary embodiment is not limited thereto, and the positions of the menus included in the respective areas may be differently arranged in accordance with the user's setting.

Further, the exemplary embodiment is not limited thereto, and in accordance with the user's setting, the second UI may include an area that includes at least one menu among the four areas and a center area that includes the enter menu. In an exemplary embodiment, if one of the other adjustment menus of the display device is a screen adjustment menu, the second UI may include the center area (a) related to the enter menu and an area (d) related to the screen adjustment. In another exemplary embodiment, the second UI may be a circular UI that includes two areas arranged in upper and lower directions and a center area. Here, the upper area of the two areas includes one of the menus related to one of the other function adjustments of the display device. Further, the lower area includes one of the remaining menus except for the menu included in the upper area among the other menus related to the function adjustments of the display device. Further, the center area includes the enter menu.

Figures 6, 7:
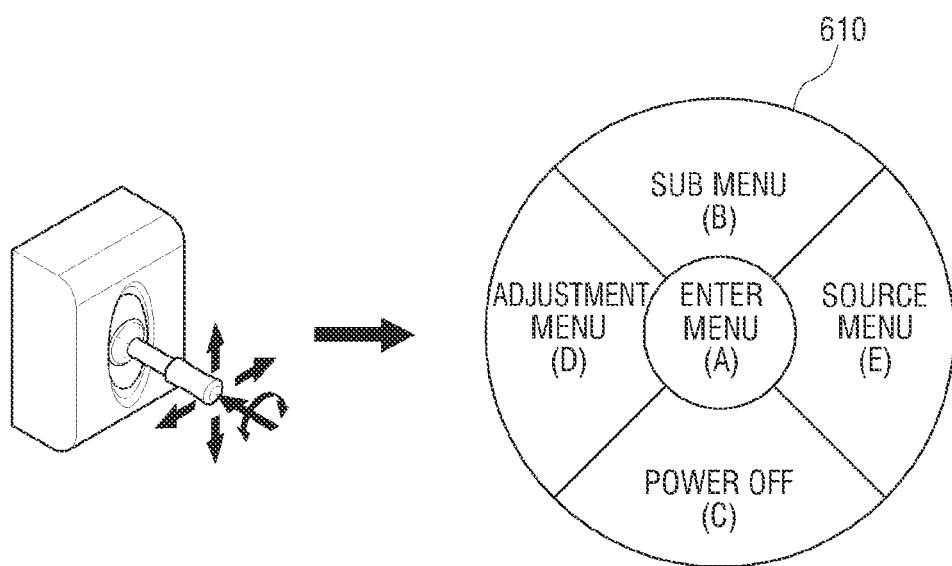
FIG. 6 is an exemplary diagram illustrating a UI related to integrated adjustment that is displayed on the screen of a display device according to another exemplary embodiment.
FIG. 7 is an exemplary diagram illustrating an enter menu function guide UI that is displayed on the screen of a display device according to another exemplary embodiment.

FIG. 6 is an exemplary diagram illustrating a UI related to integrated adjustment that is displayed on the screen of a display device according to another exemplary embodiment.

As illustrated, if the moving operation or the push operation of the jog switch 110 is performed in at least one of the upper, lower, left, and right directions the UI execution unit 121 executes an integrated UI capable of performing adjustments of the channel, volume, and other functions of the display device such that the integrate UI is displayed. The integrated UI that is displayed on the screen in accordance with the integrated UI execution command of the UI execution unit 121 may be a circular UI 610 that includes four areas arranged in upper, lower, left, and right directions and a center area. Here, the center area includes an enter menu (a) for executing the channel, volume, and other functions of the display device, performing a changeover operation to the previous stage, or finishing the execution of the circular UI 610 so that the circular UI 610 is no longer displayed. Further, the four areas arranged in the upper, lower, left, and right directions include different menus in accordance with the user's setting. According to the exemplary embodiments, among the four areas, the upper area (b) includes a sub menu related to a smart hub adjustment, and the lower area (c) includes a menu related to power off. Further, the left area (d) includes a setting menu related to the channel, volume, and screen adjustments, and the right area (e) includes a source menu related to an external input adjustment for controlling an external device.

On the other hand, as described above, the display unit 130, which displays the first UI for adjusting the channel or volume of the display device and the second UI for adjusting other functions of the display device in accordance with the operation contents of the jog switch 110, can display an enter menu function guide UI in accordance with a push operation time of the jog switch 110 (e.g., a length of time the jog switch 110 is held in the pushed position) that occurs in the presence of the first or second UI, and is displayed together with the first or second UI. Such an enter menu function guide UI will be described through FIG. 7.

FIG. 7 is an exemplary diagram illustrating an enter menu function guide UI that is displayed on the screen of a display device according to another exemplary embodiment of the present invention.

As described above, the enter menu function guide UI that is displayed on the screen together with the first or second UI is a UI for guiding the enter function in accordance with the push operation time of the jog switch 110. In an exemplary embodiment, if the jog switch 110 is operated for a short time as shown as "A", the user can perform the adjustment of the menu that the user intends to adjust. By contrast, if the jog switch 110 is operated for a long time as shown as "B", the user can perform a changeover operation of the menu to transition the menu from the current menu stage to a previous menu stage. On the other hand, if the jog switch 110 is operated for a long time in a state where the current menu stage is the uppermost stage among different menu stages, the execution of the first or second UI that is currently displayed on the screen is finished such that the first or second UI is no longer displayed. Accordingly, the first or second UI that is displayed on the screen disappears from the screen.

As described above, if the moving operation or the push operation of the jog switch 110 is performed in a state where the first or second UI is executed in accordance with the execution command from the UI execution unit 121, the UI processing unit 122 adjusts the channel or volume related to the first UI or other functions of the display device related to the second UI in response to the moving operation or the push operation of the jog switch 110. The UI processing unit 122 can be achieved through the first UI adjustment unit 123 and the first UI menu emphasis unit 124.

The first UI adjustment unit 123 adjusts the channel or volume in accordance with the moving operation of the jog switch 110 in a state where the first UI is executed. The first UI adjustment unit 123 finishes the execution of the first UI in accordance with the push operation of the jog switch 110 for a preset time in a state where the first UI is executed. The first UI menu emphasis unit 124 generates a highlight mark in a menu area related to the channel or volume that is adjusted by the first UI adjustment unit. In an exemplary embodiment, as illustrated in FIG. 3, if the moving operation of the jog switch 110 is performed in the upper side direction in a state where the first UI is executed, the first UI menu emphasis unit 124 generates a highlight mark so that the area related to the channel adjustment is emphasized.

Thereafter, if the push operation of the jog switch 110 is performed within a preset time of highlighting an area, the first UI adjustment unit 123 performs a process corresponding to the highlighted area so that the channel-up adjustment is adjusted. Accordingly, if the moving operation of the jog switch 110 is performed in the upper side direction and then the enter function command is received, the first UI adjustment unit 123 processes the channel-up command. Alternatively, the channel up adjustment may be performed without receiving the enter function command.

On the other hand, if the push operation of the jog switch 110 is performed for a time that exceeds the preset time of highlighting the selected area, the first UI adjustment unit 123 performs a changeover to a first UI state that is initially displayed on the screen. That is, the highlighting disappears from the first UI and the first UI returns to its original state. Thereafter, if another push operation of the jog switch 110 is performed for a time that exceeds the preset time, the first UI adjustment unit 123 finishes the execution of the first UI that is currently displayed on the screen such that the first UI is no longer displayed.

In another exemplary embodiment, as illustrated in FIG. 4, if the jog switch 110 is operated in the upper or lower side direction in a state where the first UI is executed, the first UI adjustment unit 123 adjusts the channel-up or channel-down in response to the operation in the upper or lower side direction. On the other hand, if the jog switch 110 is operated in the left or right side direction in a state where the first UI is executed, the first UI adjustment unit 123 adjusts the volume-up or volume-down in response to the operation in the left or right side direction. On the other hand, if the push operation of the jog switch 110 is performed in a state where the first UI is executed, the first UI adjustment unit 123 finishes the execution of the first UI that is currently displayed on the screen.

As described above, the UI processing unit 122 that adjusts the channel or volume related to the first UI can adjust other functions of the display device related to the second UI through the second UI menu emphasis unit 125 and the second UI emphasis unit 126. The second UI menu emphasis unit 126 generates a highlight mark so that the menu area that corresponds to the moving operation direction of the jog switch 110 among the plurality of menus related to the second UI is emphasized in a state where the second UI is executed. Further, the second UI adjustment unit 126 adjusts the function related to the highlighted menu in accordance with the push operation and the moving operation of the jog switch 110 in a state where the highlight is processed in the menu area. As described above, if the push operation of the jog switch 110 is performed for the preset time in a state where the second UI is executed, the second UI adjustment unit 126 performs a changeover operation from the currently proceeding menu stage to the previous menu stage or finishes the execution of the second UI that is currently displayed.

In the exemplary embodiment, if the jog switch 110 is operated in the left side direction in a state where the second UI that is a circular UI is executed, the second UI menu emphasis unit 125 generates a highlight mark so that the area that includes the adjustment menu related to the screen adjustment is emphasized.

If the operation of the jog switch 110 is performed in a state where a menu area from among a plurality of menu areas related to the second UI is highlighted, the second UI menu emphasis unit 125 may move the highlight to a menu area corresponding to a moving direction of the jog switch 110.

If the push operation of the jog switch 110 is performed for less than a preset threshold time in a state where a menu area from among a plurality of menus related to the second UI is highlighted, the second UI adjustment unit 126 outputs a menu window regarding the highlight-processed menu. As shown in FIG. 5, if the push operation is performed on an area including the adjustment menu related to the screen adjustment for less than a preset threshold time, the second UI adjustment unit 126 outputs a menu window of the menu related to the screen adjustment.

Thereafter, if the push operation of the jog switch 110 is performed within the preset time, the second adjustment unit 126 outputs a sub-menu window of the adjustment menu related to the screen adjustment. If the moving operation and the push operation of the jog switch 110 are performed in a state where the sub-menu window is output and displayed, the second UI adjustment unit 126 can adjusts the color, brightness, or size of the screen in response to the operation of the jog switch 110. On the other hand, if the push operation of the jog switch 110 is performed for a time that exceeds the preset threshold time in any stage of the above-described stages, the second UI adjustment unit 126 performs a changeover operation of the menu to transition the menu from the current menu stage to the previous menu stage.

At this time, if the current stage is the initial screen display stage, the second UI adjustment unit 126 finishes the execution of the second UI that is currently displayed on the screen such that the second UI is no longer displayed.

On the other hand, if the moving operation or the push operation of the jog switch 110 is not performed for the preset time in a state where the first or second UI is executed through the UI execution unit 121, the first UI adjustment unit 124 and the second UI adjustment unit 126 finishes the execution of the first UI or the second UI that is currently displayed on the screen. That is, the first UI adjustment unit 124 and the second UI adjustment unit 126 check whether the jog switch 110 is operated for the preset time in a state where the first or second UI is executed. If it is determined that the jog switch 110 is not operated for the preset time, the execution of the first or second UI that is currently displayed on the screen is automatically finished and removed from the display.

Up to now, the respective constituent elements of the display device have been described in detail. Hereinafter, a method of adjusting functions of the display device in accordance with the operation of the jog switch according to an exemplary embodiment will be described.

FIG. 8 is a flowchart illustrating a method of adjusting functions of a display device according to an exemplary embodiment.

As illustrated, the display device monitors and determines whether the jog switch is operated (S180). Here, the jog switch is an operation means for adjusting other functions of the display device such as the volume, channel, and screen state. The jog switch can perform a moving operation in the upper, lower, left, and right directions in the same manner as the joystick and can perform a push operation in the same manner as the input button. However, the exemplary embodiment is not limited thereto, and the jog switch can perform a rotation operation in the left and right directions. The jog switch is formed to project with a predetermined height from one side surface or one side of the rear surface of the display device. Accordingly, a user can easily grasp which point the jog switch is formed at through feeling in the user's hand only.

When it is determined that the jog switch is operated (S180), the display device determines whether the operation of the jog switch is a moving operation in at least one of the upper, lower, left, and right directions or a push operation (S820). If it is determined that the moving operation of the jog switch is performed in at least one of the upper, lower, left, and right directions, the display device displays the first UI which enables the channel and volume adjustments on the screen (S830).

On the other hand, the jog switch may perform a push operation related to a power on/off of the display device. Thus, if the push operation of the jog switch is performed in a state where the power of the display device is off, the display device may turn on the power, at the same time, display the first UI.

Here, the first UI may be displayed on the screen as illustrated in FIG. 3 or 4. For example, as illustrated in FIG. 3, the first UI may be a circular UI that includes four areas arranged in the upper, lower, left, and right directions and a center area. Here, the center area includes an enter menu for finishing the execution of the circular UI or for displaying the previous state of the current UI on the screen. Further, among the four areas that are arranged in the upper, lower, left, and right directions, the upper area includes a channel-up menu, and the lower area includes a channel-down menu. Further, the left area includes a volume-down menu, and the right area includes a volume-up menu. However, the exemplary embodiment is not limited thereto, and the positions of the menus that are included in the respective areas may be set differently.

Further, as illustrated in FIG. 4, the first UI may be displayed on the screen as a bar graph type UI. The upper bar graph type UI may be a UI related to channel adjustment, and the lower bar graph type UI may be a UI related to volume adjustment. However, the exemplary embodiment is not limited thereto, and the upper bar graph type UI may be a UI related to volume adjustment and the lower bar graph type UI may be a UI related to channel adjustment in accordance with the user's setting. The respective bar graph type UIs may be vertically formed.

On the other hand, if it is determined that the push operation of the jog switch is performed, the display device displays the second UI related to other function adjustments of the display device on the screen (S840).

According to an exemplary embodiment, as described above, if the push operation is performed on the center area of the jog switch in a state where the first UI is executed, the display device may convert the first UI for adjusting a channel or a volume into the second UI for adjusting other functions of the display device.

Here, as illustrated in FIG. 5, the second UI may be a circular UI that includes four areas arranged in the upper, lower, left, and right directions and a center area, or a block type UI that includes a center area and four areas separately arranged in the upper, lower, left, and right directions from the center area. The center area of the second UI includes an enter menu for finishing the execution of the second UI or for displaying the previous state of the current UI on the screen. Further, the four areas arranged in the upper, lower, left, and right directions include different menus in accordance with the user's setting. As illustrated in FIG. 5, the upper area includes a sub menu related to a smart hub adjustment, and the lower area includes a menu related to power off. Further, the left area includes an adjustment menu for screen adjustment, and the right area includes a source menu related to an external input adjustment.

As described above, if a following operation of the jog switch is performed in a state where the first UI related to the channel and volume adjustments or the second UI related to other function adjustments of the display device is displayed on the screen, the display device adjusts the corresponding function of the first UI or the second UI in accordance with the following operation contents of the jog switch (S850). In an exemplary embodiment, if the moving operation of the jog switch is performed upward or downward in a state where the first UI is displayed on the screen, the display device adjusts the channel-up or channel-down. In another exemplary embodiment, if the moving operation of the jog switch is performed leftward or rightward in a state where the first UI is displayed on the screen, the display device adjusts the volume-up or volume-down. In still another exemplary embodiment, if the push operation of the jog switch is performed in a state where the first UI is displayed on the screen, the display device finishes the execution of the first UI. Accordingly, the first UI that is displayed on the screen disappears from the screen.

On the other hand, in still another exemplary embodiment, if the moving operation of the jog switch is performed in any one of the upper, lower, left, and right directions in a state where the second UI is executed, the display device generates a highlight mark so that the area that corresponds to the direction corresponding to the moving operation of the jog switch is emphasized. Thereafter, if the push operation of the jog switch is performed for a preset threshold time, that is, for a short time, the menu in the highlighted area is adjusted. That is, the area which displays the highlighted menu is adjusted to display a sub-menu therein.

If an operation of the jog switch is performed in a state where the highlight is processed in a menu area from among a plurality of menus related to the second UI, the display device may move the highlight to the menu area corresponding to a moving direction of the operated jog switch.

If the push operation of the jog switch is performed for less than a preset threshold time in a state where the highlight is processed in a menu area from among the plurality of menus related to the second UI, the display device adjusts the menu in the highlighted-area.

For example, if the push operation of the jog switch is performed for a short time in a state where the left menu that includes the menu related to the screen adjustment is highlight-processed, the display device outputs a sub-menu window of the menu area related to the screen adjustment on the screen. If the moving operation of the jog switch is performed in a state where the sub-menu window is output, the display device may adjust the color, brightness, or size of the screen. On the other hand, if the push operation of the jog switch is performed for a time that exceeds the preset threshold time in a state where the second UI is executed, the display device performs a changeover operation to transition the menu from the current UI to the previous UI, or finishes the execution of the second UI.

In still another exemplary embodiment, if it is determined that the jog switch is not operated for the preset time in a state where the first or second UI is executed, the execution of the first or second UI that is currently displayed on the screen is automatically finished.

As described above, the user can easily adjust diverse functions of the display device through the moving operation or the push operation of one jog switch that is formed on the rear surface or the side surface of the display device according to the exemplary embodiments.

While the invention has been shown and described with reference to certain exemplary embodiments thereof, it will be understood by those skilled in the art that various changes in form and detail may be made therein without departing from the spirit and scope of the invention, as defined by the appended claims.

What is claimed is:

1. A display apparatus comprising:
   a display panel;
   a switch configured to be pushed, the switch being disposed on a rear side or a lateral side of the display apparatus; and
   a controller configured to:
      display on the display panel a plurality of icons corresponding to a plurality of functions of the display apparatus, respectively,
      while the plurality of icons are displayed on the display panel, select an icon of the plurality of icons in response to a first push input operation of the switch, and
      while the icon of the plurality of icons is selected, execute a function corresponding to the selected icon in response to a second push input operation of the switch that has a different push operation time from the first push input operation of the switch.

2. The display apparatus of claim 1, wherein the controller is further configured to turn on the display panel in response to a user input pushing the switch while the display panel is off.

3. The display apparatus of claim 1, wherein the controller is further configured to display on the display panel a guide information indicating an operation relating to the switch.

4. The display apparatus of claim 3, wherein the controller is further configured to turn on the display panel and display on the display panel the guide information, in response to a user input pushing the switch while the display panel is off.

5. A display apparatus comprising:
   a display panel;
   a switch configured to be pushed, the switch being disposed on a rear side or a lateral side of the display apparatus; and
   a controller configured to:
      in a first menu stage, display on the display panel a plurality of icons corresponding to a plurality of functions of the display apparatus, respectively,
      in a second menu stage, display on the display panel a selected icon of the plurality of icons according to a first push input operation of the switch, and
      while the selected icon is displayed, execute a function corresponding to the selected icon in response to a second push input operation of the switch that has a different push operation time from the first push input operation of the switch.

6. The display apparatus of claim 5, wherein the controller is further configured to turn on the display panel in response to a user input pushing the switch while the display panel is off.

7. The display apparatus of claim 5, wherein the controller is further configured to display on the display panel a guide information indicating an operation relating to the switch.

8. The display apparatus of claim 7, wherein the controller is further configured to turn on the display panel and display on the display panel the guide information, in response to a user input pushing the switch, while the display panel is off.

9. A display apparatus comprising:
   a display panel;
   a switch configured to be pushed, the switch being disposed on a rear side or a lateral side of the display apparatus; and
   a controller configured to:
      display on the display panel a first menu stage of a plurality of icons corresponding to a plurality of functions of the display apparatus, respectively, display on the display panel a selected icon of the plurality of icons in a second menu stage, according to a first push input operation of the switch, and while the selected icon is displayed, execute a function corresponding to the selected icon in response to a second push input operation of the switch that has a different push operation time from the first push input operation of the switch.

10. The display apparatus of claim 9, wherein the controller is further configured to turn on the display panel in response to a user input pushing the switch while the display panel is off.

11. The display apparatus of claim 9, wherein the controller is further configured to display on the display panel a guide information indicating an operation relating to the switch.

12. The display apparatus of claim 11, wherein the controller is further configured to turn on the display panel and display on the display panel the guide information, in response to a user input pushing the switch, while the display panel is off.

* * * * *